United States Patent

Nishiyama

(10) Patent No.: US 9,549,278 B2
(45) Date of Patent: Jan. 17, 2017

(54) COMMUNICATION SYSTEM, COMMUNICATION APPARATUS, METHODS OF CONTROLLING SAME, AND STORAGE MEDIUM

(75) Inventor: Masashi Nishiyama, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 504 days.

(21) Appl. No.: 13/463,202

(22) Filed: May 3, 2012

(65) Prior Publication Data

US 2012/0290658 A1  Nov. 15, 2012

(30) Foreign Application Priority Data

May 11, 2011 (JP) ................................ 2011-106631

(51) Int. Cl.
*H04W 4/00* (2009.01)
*H04L 12/64* (2006.01)

(52) U.S. Cl.
CPC .......... *H04W 4/001* (2013.01); *H04L 12/6418* (2013.01)

(58) Field of Classification Search
CPC ............................ H04L 12/6418; H04W 4/001
USPC ........................................................ 709/204
See application file for complete search history.

(56) References Cited

U.S. PATENT DOCUMENTS

| | | | |
|---|---|---|---|
| 7,389,448 B2* | 6/2008 | Sakai ............................... | 714/48 |
| 8,131,859 B2* | 3/2012 | Fujii et al. ..................... | 709/228 |
| 2004/0193725 A1* | 9/2004 | Costa-Requena et al. ... | 709/238 |
| 2004/0248594 A1* | 12/2004 | Wren, III ....................... | 455/465 |
| 2006/0168196 A1* | 7/2006 | Herbert et al. ................ | 709/224 |
| 2007/0070410 A1* | 3/2007 | Suzuki et al. ................ | 358/1.15 |
| 2008/0147776 A1* | 6/2008 | Inoue ............................ | 709/202 |
| 2009/0262668 A1* | 10/2009 | Hemar et al. .................. | 370/260 |
| 2011/0305202 A1* | 12/2011 | Wang et al. ................... | 370/328 |
| 2011/0314144 A1* | 12/2011 | Goodman ...................... | 709/224 |
| 2012/0150955 A1* | 6/2012 | Tseng ............................ | 709/204 |
| 2012/0324063 A1* | 12/2012 | Wang et al. ................... | 709/220 |
| 2014/0012813 A1* | 1/2014 | Oh et al. ....................... | 707/635 |

FOREIGN PATENT DOCUMENTS

JP         2006-202217 A         8/2006

* cited by examiner

*Primary Examiner* — Michael C Lai
(74) *Attorney, Agent, or Firm* — Carter, DeLuca, Farrell & Schmidt, LLP

(57) ABSTRACT

A first communication apparatus generates export data, which includes an address book indicating data transmission destinations and indication information indicating that it is necessary to communicate with a server in order to transmit data to an address contained in the address book, and transmits the export data to a second communication apparatus. The second communication apparatus receives the export data transmitted from the first communication apparatus and sets an address book and indication information of the second communication apparatus in accordance with the export data.

13 Claims, 7 Drawing Sheets

FIG. 3 address book 400

| DESTINATION NAME | PROTOCOL | DESTINATION ADDRESS | |
|---|---|---|---|
| DOCUMENT SERVER 105 | HTTP | http://www.document105.com/ | 401 |
| BUSINESS CONTACT FAX | FAX | 1111-11-1112 | |
| LOCAL FTP SERVER | FTP | ftp://fileserver.local/folder | |

NETWORK COMMUNICATION SUPPORT SERVER INFORMATION 500

| PROXY SERVER INFORMATION | | 501 |
|---|---|---|
| USE / DO NOT USE PROXY SERVER | USE | |
| PROXY SERVER ADDRESS | 192.0.0.4 | |
| DNS SERVER INFORMATION | | 502 |
| USE / DO NOT USE DNS SERVER | USE | |
| DNS SERVER ADDRESS | 192.0.0.5 | |

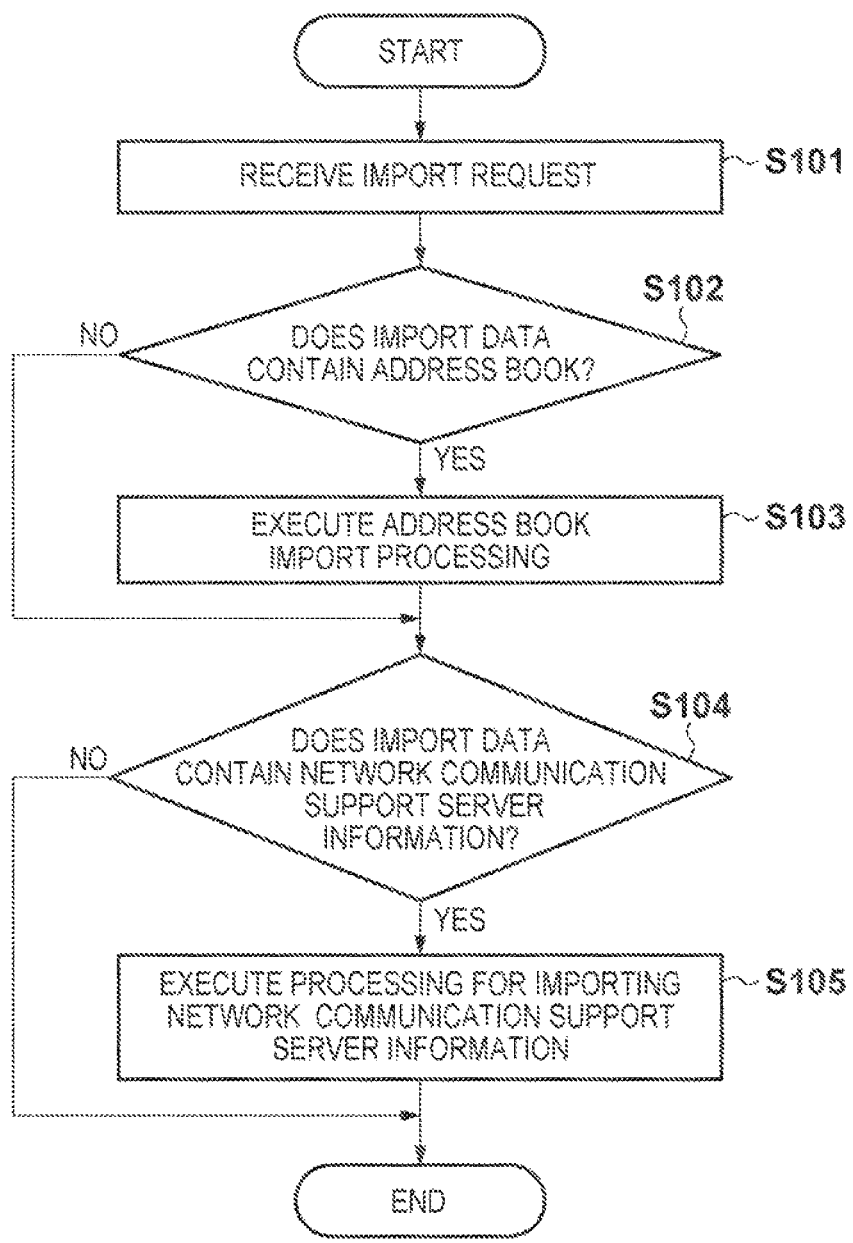

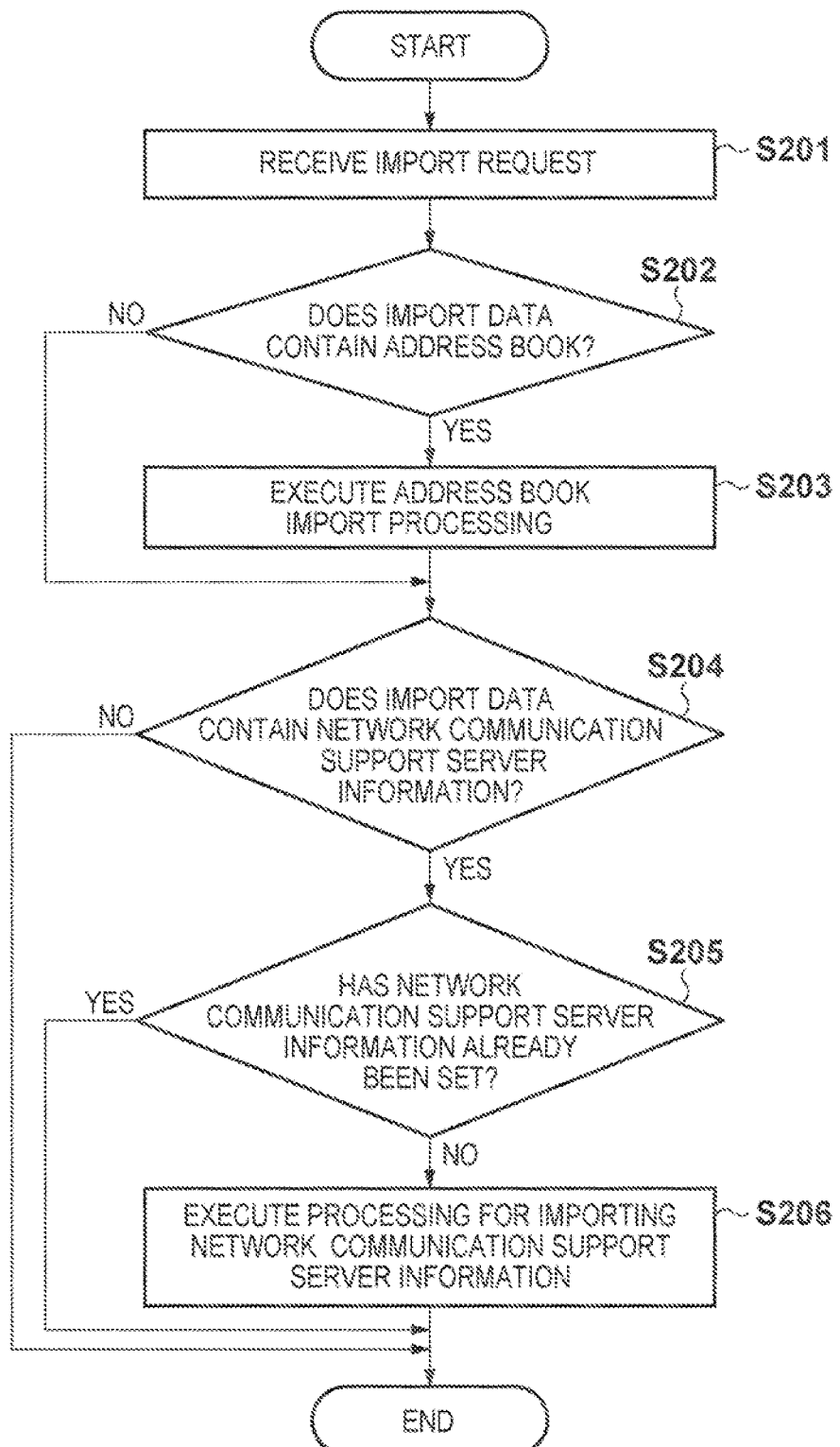

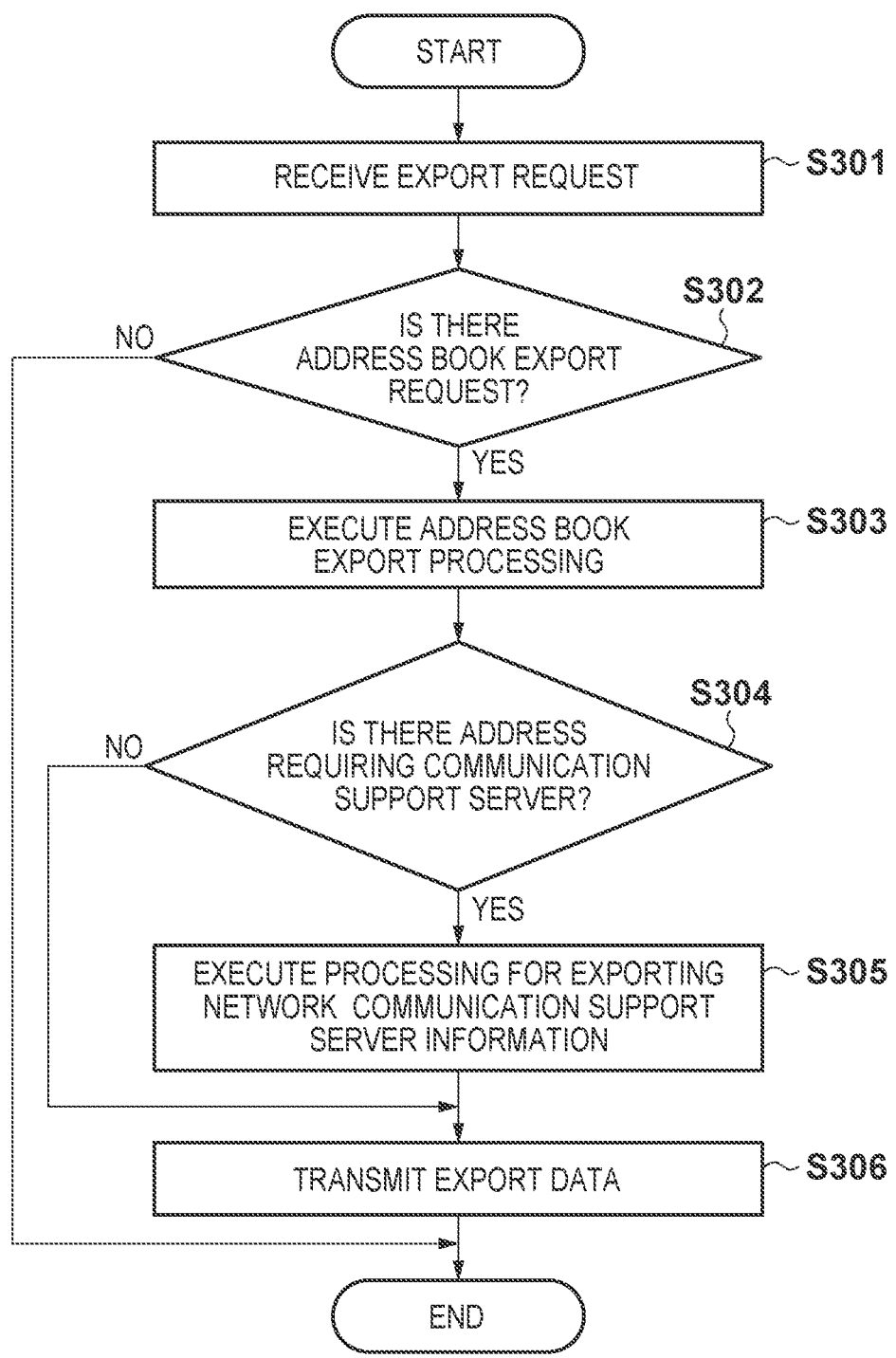

COMMUNICATION SYSTEM, COMMUNICATION APPARATUS, METHODS OF CONTROLLING SAME, AND STORAGE MEDIUM

BACKGROUND OF THE INVENTION

Field of the Invention

The present invention relates to a communication system, a communication apparatus, methods of controlling these, and a computer-readable storage medium.

Description of the Related Art

A communication apparatus known in the art has a document transmission function for transmitting electronic data, which has been obtained by reading and outputting an original using a scanner, to an external apparatus connected by a network. With an image processing and transmitting function, a document is transmitted using a technique such as HTTP (HyperText Transfer Protocol), FTP (File Transfer Protocol) or email. In order to manage the addresses of document transmission destinations in a communication apparatus, therefore, the general practice is to adopt an arrangement in which an address book capable of registering a plurality of addresses is stored within the apparatus. Further, the specification of Japanese Patent Laid-Open No. 2006-202217 proposes a technique in which the address book of a communication apparatus is exported and imported to another communication apparatus, thereby alleviating the labor involved in registering the address book at the other communication apparatus.

However, the problem set forth below is encountered in the prior art. For example, when an address book is exported and imported, no consideration whatsoever is given to the setting status of the network setting in the communication apparatus that is to receive the import. With document transmission using HTTP or FTP, there are cases where a document is transmitted to an Internet address in a wide-area network. A wide-area network is also referred to as a WAN or the Internet and indicates a network other than a LAN (Large-Area Network). In a case where a document is transmitted to an address on a WAN, generally the document is relayed through a proxy server, though this will depend upon the network environment. A proxy server is provided at the boundary of a LAN and WAN and indicates an apparatus serving as a "proxy" for implementing a connection to the WAN by taking the place of an apparatus on the LAN that is incapable of being connected directly to the WAN. In such an environment, it is required that the proxy server information to be relayed be set in the communication apparatus beforehand. Accordingly, even if an address book containing an address on a WAN is imported to a communication apparatus in which proxy server information has not been set, there is the possibility that the address on the WAN will not be usable as is. In other words, even if transmission of a document is executed using the address on the WAN, the document will not be relayed through the proxy server. As a consequence, the document cannot be transmitted to a WAN outside a LAN and the transmission will end in an error.

Further, there are instances where the address information of an address book is expressed by an FQDN (Fully Qualified Domain Name). When a document is transmitted using an address expressed by FQDN (referred to as an "FQDN address" below), a name-resolution request must be issued to a DNS (Domain Name System) server and an IP address must be obtained from the FQDN address. This means that when an FQDN address is used, it is necessary to set the DNS server information in the communication apparatus beforehand. A server necessary for document transmission in the manner of a proxy server or DNS server will be referred to as a "network communication support server" below. The prior art mentioned above is such that, in a case where an address book necessitating a network communication support server has been imported, there is the possibility that the address book will not be usable as is because no consideration has been given to the setting status of the network communication support server at the import destination. In order to make such an address book usable, it is necessary for the user to take the trouble to set the address of the network communication support server at the import destination. This is a laborious task as far as the user is concerned.

SUMMARY OF THE INVENTION

The present invention enables realization of a communication system, a communication apparatus, methods of controlling same and a storage medium that enable an address book, in which transmission-destination addresses used in a document transmission function have been defined, to be imported from another communication apparatus taking into consideration information relating to a network communication support server, thereby making it possible to use the address book with facility.

One aspect of the present invention provides a communication system having a first communication apparatus and a second communication apparatus, wherein the first communication apparatus comprises: a generating unit that generates export data, which includes an address book indicating data transmission destinations and indication information indicating that it is necessary to communicate with a server in order to transmit data to an address contained in the address book; and a transmitting unit that transmits the export data, which has been generated by the generating unit, to the second communication apparatus; and the second communication apparatus comprises: a receiving unit that receives the export data transmitted from the first communication apparatus; and a setting unit that sets an address book and indication information of the second communication apparatus in accordance with the export data that has been received by the receiving unit.

Another aspect of the present invention provides a communication apparatus for transmitting data to another communication apparatus, comprising: a generating unit that generates export data, which includes an address book indicating data transmission destinations and indication information indicating that it is necessary to communicate with a server in order to transmit data to an address contained in the address book; and a transmitting unit that transmits the export data, which has been generated by the generating unit, to the other communication apparatus.

Still another aspect of the present invention provides a communication apparatus for receiving data from another communication apparatus, comprising: a receiving unit that receives an address book, which indicates data transmission destinations, transmitted from the other communication apparatus, and indication information, which has been transmitted from the other communication apparatus, indicating that it is necessary to communicate with a server in order to transmit data to an address contained in the address book; and a setting unit that sets an address book and indication information of the communication apparatus in accordance with the export data that has been received by the receiving unit.

Yet still another aspect of the present invention provides a method of controlling a communication system having a first communication apparatus and a second communication apparatus, comprising: in the first communication apparatus: generating, by a generating unit, export data, which includes an address book indicating data transmission destinations and indication information indicating that it is necessary to communicate with a server in order to transmit data to an address contained in the address book; and transmitting, by a transmitting unit, the export data, which has been generated at the generating step, to the second communication apparatus; and in the second communication apparatus: receiving, by a receiving unit, the export data transmitted from the first communication apparatus; and setting, by a setting unit, an address book and indication information of the second communication apparatus in accordance with the export data that has been received at the receiving step.

Still yet another aspect of the present invention provides a method of controlling a communication apparatus for transmitting data to another communication apparatus, comprising: generating, by a generating unit, export data, which includes an address book indicating data transmission destinations and indication information indicating that it is necessary to communicate with a server in order to transmit data to an address contained in the address book; and transmitting, by a transmitting unit, the export data, which has been generated at the generating step, to the other communication apparatus.

Still yet another aspect of the present invention provides a method of controlling a communication apparatus for receiving data from another communication apparatus, comprising: receiving, by a receiving unit, an address book, which indicates data transmission destinations, transmitted from the other communication apparatus, and indication information, which has been transmitted from the other communication apparatus, indicating that it is necessary to communicate with a server in order to transmit data to an address contained in the address book; and setting, by a setting unit, an address book and indication information of the communication apparatus in accordance with the export data that has been received at the receiving step.

Yet still another aspect of the present invention provides a non-transitory computer-readable storage medium storing a program for executing on a computer each step in the control method of controlling a communication system.

Still yet another aspect of the present invention provides a non-transitory computer-readable storage medium storing a program for executing on a computer each step in the control method of controlling a communication apparatus.

Further features of the present invention will become apparent from the following description of exemplary embodiments (with reference to the attached drawings).

BRIEF DESCRIPTION OF THE DRAWINGS

FIG. 3 is a diagram illustrating an example of address book information according to the first embodiment;

FIG. 4 is a diagram illustrating an example of network communication support server information according to the first embodiment;

FIG. 6 is a flowchart illustrating an example operation of an MFP 102 when import of an address book is carried out according to the first embodiment;

FIG. 7 is a flowchart illustrating an example operation of an MFP 102 when import of an address book is carried out according to a second embodiment of the present invention; and FIG. 8 is a flowchart illustrating an example operation of an MFP 101 when export of an address book is carried out according to a third embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Communication System Configuration

Reference will be had to FIGS. 1 to 6 to describe a first embodiment of the present invention. First, an example of the configuration of a communication system according to this embodiment will be described with reference to FIG. 1. MFPs (Multi-Function Peripherals) 101 and 102 are equipped with a scanning function and various communication functions. The MFPs 101 and 102 have address books in which a plurality of addresses can be registered in order to manage addresses of document transmission destinations. The MFPs 101 and 102 further have an address book import/export function. In accordance with this embodiment, the MFP 101 is one example of a first communication apparatus and exports its address book. The MFP 102, on the other hand, is one example of a second communication apparatus and imports data that has been exported from the MFP 101.

A client personal computer 103 is capable of issuing address book export and import execution instructions of the MFPs 101 and 102. The system further includes a proxy server 104 and a DNS server 106. The DNS server 106 executes name resolution from an FQDN address to an IP address in response to a request from the MFPs 101, 102, which are clients, the client personal computer 103 or the proxy server 104.

Figure 1:
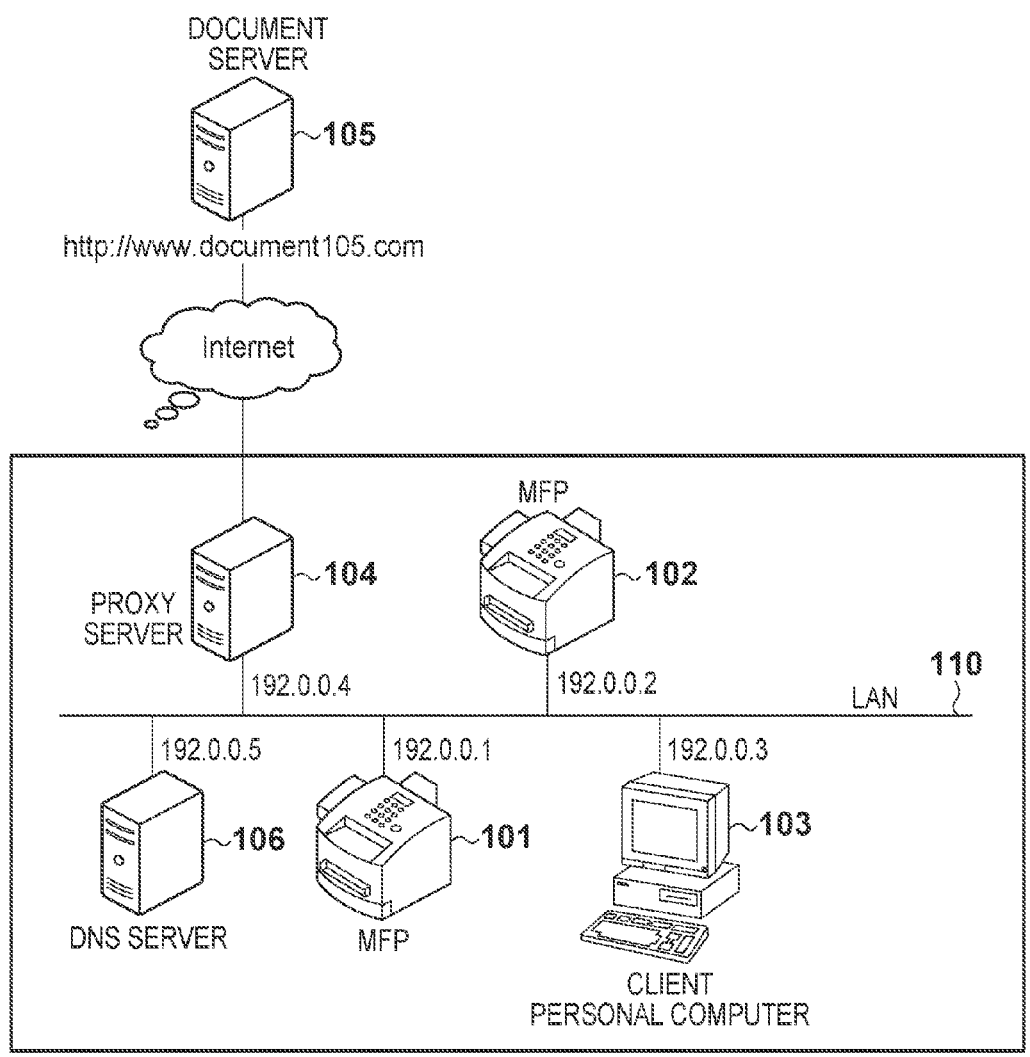
FIG. 1 is a diagram illustrating an example of the configuration of a communication system according to a first embodiment of the present invention.

As shown in FIG. 1, the MFPs 101, 102, client personal computer 103, proxy server 104 and DNS server 106 are connected to a LAN 110 so as to be capable of communicating. The MFPs 101, 102, client personal computer 103, proxy server 104 and DNS server 106 have been assigned private IP addresses 192.0.0.1 to 192.0.0.5, respectively. The LAN 110 is connected to the Internet by relay through the proxy server 104.

A document server 105 is a server for storing various electronic data in response to a request from the MFPs 101, 102, which are clients. The HTTP protocol is used for communication. The document server 105 possesses a global IP address and is connected to the Internet. The document server 105 makes available a URL (Uniform Resource Locator) corresponding to the global IP address. For example, the URL is http://www.document105.com. It is required that the proxy server 104 act as a relay in order for an apparatus connected to the LAN 110 to communicate with the document server 105.

Device Configuration

Figure 2:
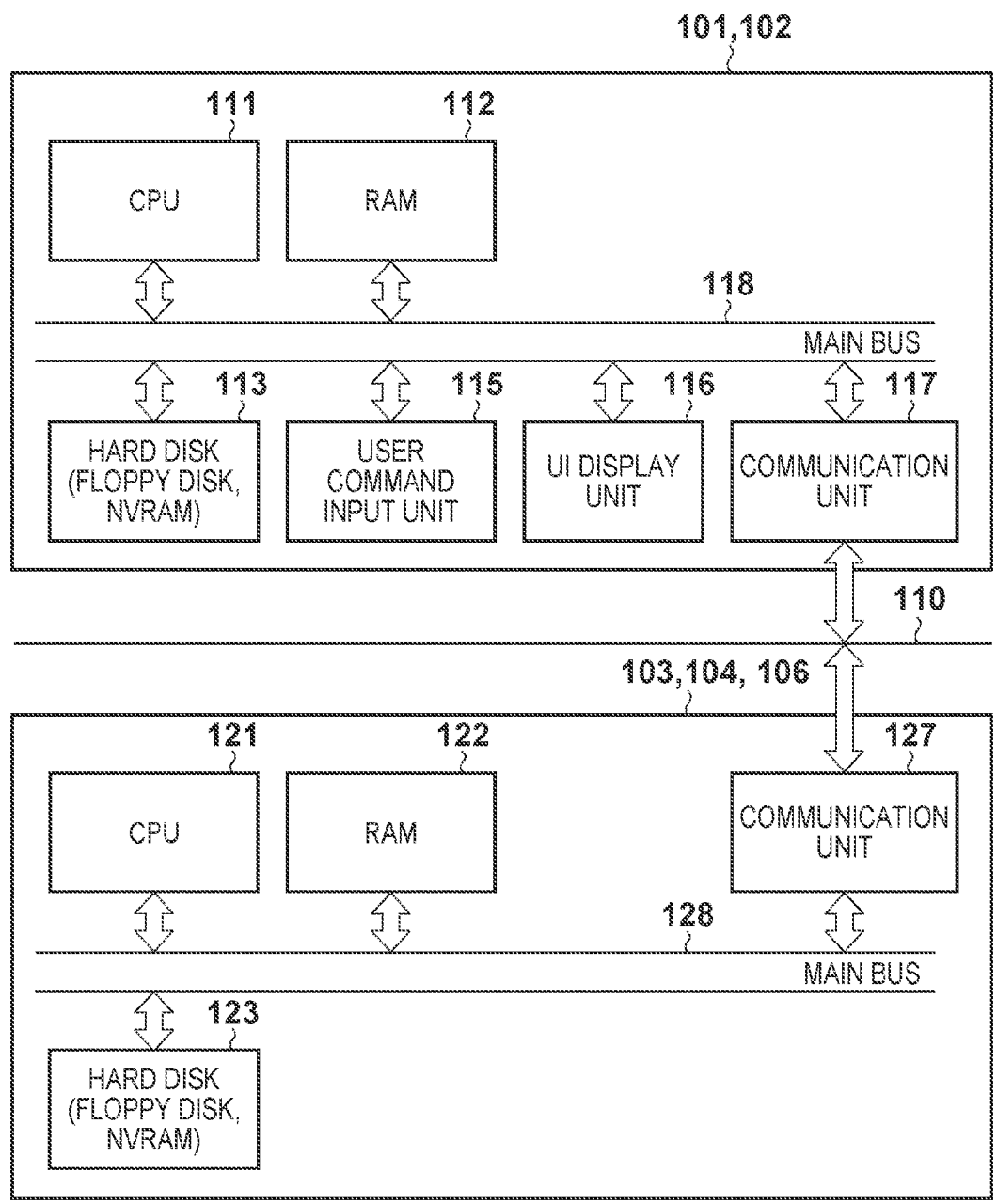
FIG. 2 is a diagram illustrating an example of the configuration of a device according to the first embodiment.

Next, reference will be had to FIG. 2 to describe the configuration of the devices shown in FIG. 1. The device configuration of the MFPs 101 and 102 will be described first. Each MFP has a CPU 111; a RAM 112 that provides a work area for the CPU 111; a hard disk (or other storage device) 113 for storing the program of the present invention and various settings; a user command input unit 115 for allowing a user (inclusive of a person performing installation) to input commands; a UI display unit 116 for presenting a screen display; a communication unit 117 for network communication with another device; and a main bus 118. It should be noted that, unless specified otherwise, the CPU 111 in the MFPs 101 and 102 exercises overall control of the RAM 112, hard disk 113, user command input unit 115, UI display unit 116 and communication unit 117 via the main bus 118.

Next, the device configurations of the client personal computer 103, proxy server 104 and DNS server 106 will be described. It should be noted that, since the document server 105 has a configuration similar to these devices, the configuration thereof is not described here. Each has a CPU 121; a RAM 122 that provides a work area for the CPU 121; a hard disk (or other storage device) 123 for storing the program of the present invention and various settings; a communication unit 127 for network communication with another device; and a main bus 128. It should be noted that, unless specified otherwise, the CPU 121 in the client personal computer 103, proxy server 104, document server 105 and DNS server 106 exercises overall control of the RAM 122, hard disk 123 and communication unit 127 via the main bus 128.

Address Book

Next, reference will be had to FIG. 3 to describe an address book 400 possessed by the MFP 101. The address book 400 defines information such as destination name, protocol and destination address, by way of example. Destination name is a character string indicating a destination and can be set appropriately by the user. Protocol indicates the communication protocol used when a document is transmitted. In the example of address book 400, the communication protocols are HTTP, FAX and FTP. Destination address is address information indicating the destination of the document transmission. The information is URL information if the protocol is HTTP or FTP and is telephone-number information if the protocol is FAX. By way of example, information 401 in FIG. 3 is that of the document server 105, which is the destination to which a document is transmitted. Specifically, according to information 401, "document server 105" has been set as the destination name, "HTTP" has been set as the protocol, and "http://www.document105.com" has been set as the destination address.

Network Communication Support Server Information

Next, reference will be had to FIG. 4 to describe network communication support server information 500 (support information) possessed by the MFP 101. The network communication support server information 500 includes proxy server information 501 and DNS server information 502, by way of example. The proxy server information 501 includes information indicative of "USE/DO NOT USE PROXY SERVER" and "PROXY SERVER ADDRESS". If "USE" has been selected in "USE/DO NOT USE PROXY SERVER", then the document is transmitted to an external network by being relayed through the proxy server set forth in "PROXY SERVER ADDRESS". The external network is, for example, the Internet. The contents set forth in proxy server information 501 indicate information concerning the proxy server 104 shown in FIG. 1.

The DNS server information 502 includes information indicative of "USE/DO NOT USE DNS SERVER" and "DNS SERVER ADDRESS". If "USE" has been selected in "USE/DO NOT USE DNS SERVER", then name resolution of an FQDN address is requested of the DNS server set forth in "DNS SERVER ADDRESS". The contents set forth in DNS server information 502 indicate information concerning the DNS server 106 shown in FIG. 1.

Address Book Export

Figure 5:
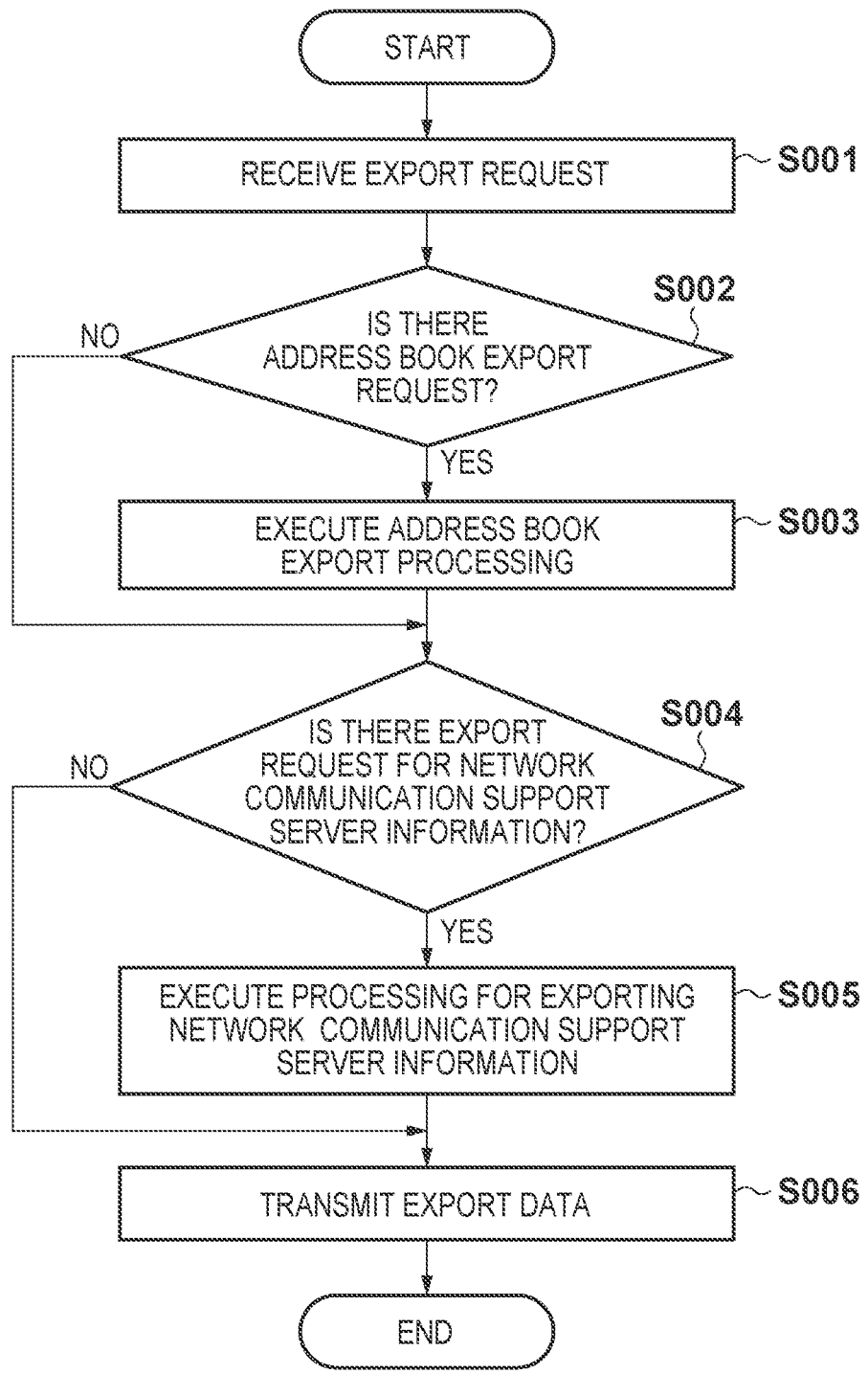
FIG. 5 is a flowchart illustrating an example operation of an MFP 101 when export of an address book is carried out according to the first embodiment.

Reference will now be had to FIG. 5 to describe the flow of processing by the MFP 101 when export of an address book is performed according to this embodiment. The processing described below is executed by having the CPU 111 of MFP 101 read out the control program, which has been stored on the hard disk 113, to the RAM 112 and then run the program. It should be noted that address book export indicates processing for reading out an address book, which has been stored in the local apparatus, and outputting the address book information to an external apparatus.

First, at step S001, the CPU 111 of MFP 101 accepts an export request from the client personal computer 103. Alternatively, the CPU 111 accepts an export request that has been input from the user command input unit 115. Next, at step S002, the CPU 111 determines whether the export request contains an address book export request (first information). Here the first information is information indicating whether export data including an address book is necessary. If the export request contains an address book export request, processing proceeds to step S003. Here the CPU 111 functions as first generating means and executes address book export processing. Processing then proceeds to step S004. Specifically, in export processing, data indicated in the address book 400 is generated as export data on the hard disk 113 within the MFP 101. On the other hand, if it is determined at step S002 that the export request does not contain an address book export request, then the CPU 111 proceeds to step S004.

At step S004, the CPU 111 determines whether the export request contains an export request (second information) for network communication support server information. The second information is information indicating whether export data including network communication support server information is necessary. If the export request includes an export request for network communication support server information, processing proceeds to step S005. Here the CPU 111 functions as second generating means and executes export processing for network communication support server information. Processing then proceeds to step S006. Specifically, data indicated in the network communication support server information 500 is generated as export data on the hard disk 113 of MFP 101. On the other hand, if it is determined at step S004 that the export request does not include an export request for network communication support server information, then the CPU 111 proceeds to step S006.

At step S006, the CPU 111 transmits the export data generated at step S003 or S005 to the client personal computer 103 using the communication unit 117. In this embodiment, whether network communication support server information is to be exported as a set together with the address book is determined by a designation made by the user. The user can specify whether network communication support server information also is to be exported when the user issues an export request to the MFP 101 from the client personal computer 103. For example, the communication apparatus at the import destination may already be in possession of suitable proxy server information or DNS server information. In such case, this embodiment is such that it can be arranged so that network communication support server information will not be exported or imported, depending upon the indication made by the user.

It should be noted that in the processing for transmitting export data at step S006, it goes without saying that it is possible for settings information other than an address book and network communication support server information to be transmitted as export data. For example, information that has been set in the MFP such as department (or user) management information or default information in various functions such as scan, print and copy functions can be transmitted to another MFP as export data. That is, even if a "NO" decision is rendered at both steps S002 and S004, there are instances where these items of settings information are transmitted as export data.

Address Book Import

Reference will now be had to FIG. 6 to describe the flow of processing by the MFP 102 when import of an address book is performed according to this embodiment. The processing described below is executed by having the CPU 111 of MFP 102 read out the control program, which has been stored on the hard disk 113, to the RAM 112 and then run the program. It should be noted that address book import indicates processing for loading an address book, which has been exported from the MFP 101 in the manner described in FIG. 5, in such a manner that the address book can be used by the local apparatus.

At step S101, the CPU 111 of MFP 102 receives an import request from the client personal computer 103. Receipt of the import request means that the client personal computer 103 receives export data that has been transmitted from the MFP 101, which has executed the processing shown in the flowchart of FIG. 5. Next, at step S102, the CPU 111 determines whether an address book is to be imported. In this embodiment, the determination as to whether an address book is to be imported means determining whether the received import data contains an address book. It should be noted that the import data mentioned above corresponds to the export data transmitted from the MFP 101 in the description of step S006 in FIG. 5. If an address book is included in the import data, processing proceeds to step S103, where the CPU 111 executes processing for importing the address book and then advances processing to step S104. Specifically, in import processing, data indicated in the address book 400 is set in the address book of MFP 102. On the other hand, if it is determined at step S102 that an address book is not included in the import data, then the CPU 111 advances processing to step S104 without executing address book import processing.

At step S104, the CPU 111 determines whether to import network communication support server information. In this embodiment, the determination as to whether to import network communication support server information means determining whether the received import data contains network communication support server information. If network communication support server information is included in the import data, processing proceeds to step S105, the CPU 111 executes processing for importing the network communication support server information and then terminates processing. Specifically, the data indicated in the network communication support server information 500 is set as the network communication support server information of MFP 102. If it is determined at step S104 that network communication support server information is not included in the import data, then the CPU 111 prohibits processing for importing network communication support server information.

In a case where settings information other than that of the address book and network communication support server information has been received as import data in the import processing of FIG. 6, it is possible for these items of settings information to be set in the local apparatus.

FIGS. 5 and 6 are flowcharts of processing executed in a case where an address book that has been stored in the MFP 101 is desired to be used by the MFP 102 as well. It is possible for network communication support server information that has been set in the MFP 101 to be exported to and imported from the MFP 102 as a set together with the address book. In the MFP 102, the proxy server information and DNS server information suited to the address book that has been imported is set automatically. This means that even if the imported address book contains a WAN address or an FQDN address, a document transmission using this address can be executed. Further, in this embodiment, the arrangement is such that the client personal computer 103 intermediates between the MFP 101 and MFP 102 to perform import and export. However, an arrangement may be adopted in which the MFP 101 transmits exported data directly to the MFP 102. In such case the export request received at step S001 in FIG. 5 would include information (the IP address of MFP 102, for example) indicating the transmission destination of the export data.

Second Embodiment

Next, a second embodiment of the present invention will be described with reference to FIG. 7. Here only aspects different from those of the first embodiment will be described. FIG. 7 is a flowchart illustrating the flow of processing executed by the MFP 102 when import of an address book is carried out. Steps S201 to S203 are similar to steps S101 to S103 in FIG. 6 and need not be described again. The processing described below is executed by having the CPU 111 of MFP 102 read out the control program, which has been stored on the hard disk 113, to the RAM 112 and then run the program.

At step S204, the CPU 111 of MFP 102 determines whether the import data has network communication support server information. If the import data has network communication support server information, processing proceeds to step S205. If the import data does not have network communication support server information, the CPU 111 terminates processing without executing processing for importing the network communication support server information. For example, in a case where the protocol includes an HTTP or FTP destination, as indicated in the address book 400 shown in FIG. 3, it is determined that the import data has network communication support server information.

At step S205, the CPU 111 checks to see whether network communication support server information has already been set in the local apparatus. If network communication support server information has already been set, then the CPU 111 terminates processing without executing processing for importing the network communication support server information. On the other hand, if network communication support server information has not been set, then processing proceeds to step S206 and the CPU 111 executes processing for importing the network communication support server information.

If network communication support server information has already been set, this indicates that the MFP 102 has a track record so far of executing communication using a proxy server or DNS server. Accordingly, it is unnecessary to import network communication support server information afresh. It should be noted that the network communication support server information 500 is composed of proxy server information and DNS server information. However, if one has already been set and the other has not, it is preferred that only the information that has not been set be imported. For example, control is exercised such that if proxy server information has already been set, then proxy server information is not imported, but if DNS server information has not been set, then DNS server information is imported.

Third Embodiment

Next, a third embodiment of the present invention will be described with reference to FIG. 8. Here only aspects different from those of the first embodiment will be described. FIG. 8 is a flowchart illustrating the flow of processing executed by the MFP 101 when export of an address book is carried out. Steps S301 to S303 are similar to steps S001 to S003 in FIG. 5 and need not be described again. The processing described below is executed by having the CPU 111 of MFP 101 read out the control program, which has been stored on the hard disk 113, to the RAM 112 and then run the program.

After executing processing for exporting the address book, the CPU 111 of MFP 101 determines at step S304 whether the address book to be exported has an address requiring a network communication support server. Here an address requiring a network communication support server signifies an address on a WAN requiring a proxy server or an FQDN address requiring a DNS server. In case of an address requiring a network communication support server, processing proceeds to step S305 and the CPU 111 executes processing for exporting the network communication support server information. Specifically, data indicated in the network communication support server information 500 is generated as export data on the hard disk 113 of MFP 101. On the other hand, in a case where the address is not an address requiring a network communication support server, then the CPU 111 proceeds to step S306. At step S306, the CPU 111 transmits the export data generated at step S303 or S305 to the client personal computer 103 using the communication unit 117.

Thus, this embodiment is such that, in a case where an exported address book contains an address requiring a network communication support server, the network communication support server information is exported because it is necessary at the import destination. Conversely, in a case where an exported address book does not contain an address requiring a network communication support server, network communication support server information is not exported because it is not necessary at the import destination. By exercising such control, an unnecessary setting need not be exported and imported. This is advantageous in terms of performance.

Other Embodiments

In the embodiments described above, an MFP is taken as an example of a communication apparatus. However, the communication apparatus according to the present invention is not limited solely to an MFP.

Further, in the embodiments set forth above, a communication apparatus that executes export processing and a communication apparatus that executes import processing are described as separate apparatuses. However, it is also possible for both export processing and import processing to be executed by a single communication apparatus.

Further, it may be arranged so that export processing transmits export data to a plurality of parties collectively.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-106631, filed on May 11, 2011, which is hereby incorporated by reference herein in its entirety.

What is claimed is:

1. A communication system having a first communication apparatus, a second communication apparatus, and a Domain Name System (DNS) server, wherein the first communication apparatus comprises:
   a storage unit that stores an address book containing transmission addresses;
   an accepting unit that accepts an export request from an information processing apparatus;
   a first determination unit that determines whether the address book to be exported contains a transmission address which is expressed by a Fully Qualified Domain Name (FQDN);
   a generating unit that generates export data which includes the address book in accordance with the acceptance of the export request, wherein the generating unit generates the export data including an address of the DNS server in a case where the first determination unit determines that the address book to be exported contains a transmission address which is expressed by the FQDN, wherein the DNS server performs name resolution of the transmission address which is expressed by the FQDN; and
   a transmitting unit that transmits the export data, which has been generated by the generating unit, to the information processing apparatus, and wherein the second communication apparatus comprises:
a receiving unit that receives an import request which requests the second communication apparatus to import the export data generated by the first communication apparatus from the information processing apparatus; and
a setting unit that sets the address book and the address of the DNS server in the second communication apparatus based on the export data which is imported to the second communication apparatus in accordance with the import request that has been received by the receiving unit.

2. The communication system according to claim 1, wherein the export request is for transmitting the export data,
wherein the export request includes first information indicating whether export data containing the address book is necessary, and second information indicating whether export data containing the address of the DNS server is necessary, and
wherein the generating unit comprises:
a first generating unit that, when the first information indicates that export data containing the address book is necessary, generates export data containing the address book; and
a second generating unit that, when the second information indicates that export data containing the address of the DNS server is necessary, generates export data containing the address of the DNS server.

3. The communication system according to claim 1, wherein the setting unit comprises:
a second determination unit that determines whether the address of the DNS server has already been set in the second communication apparatus; and
a prohibiting unit that prohibits setting of the address of the DNS server in accordance with the export data if the second determination unit determines that the address of the DNS server has already been set in the second communication apparatus.

4. The communication system according to claim 1, wherein the generating unit generates export data that includes the address book and the address of the DNS server when the first determination unit determines that the address book contains the transmission address which is expressed by the FQDN; and
wherein the generating unit generates export data that includes the address book but not the address of the DNS server when the first determination unit determines that the address book does not contain the transmission address which is expressed by the FQDN.

5. The communication system according to claim 1, wherein the export data generated by the generation unit further includes an address of a proxy server.

6. A communication apparatus for transmitting data to another communication apparatus, comprising:
a storage unit that stores an address book containing transmission addresses;
an accepting unit that accepts an export request from an information processing apparatus;
a determination unit that determines whether the address book to be exported contains a transmission address which is expressed by a Fully Qualified Domain Name (FQDN);
a generating unit that generates export data which includes the address book in accordance with an acceptance of the export request, wherein the generating unit generates the export data including an address of a DNS server in a case where the determination unit determines that the address book to be exported contains a transmission address which is expressed by the FQDN, wherein the DNS server performs name resolution of the transmission address which is expressed by the FQDN; and
a transmitting unit that transmits the export data, which has been generated by the generating unit, to the another information processing apparatus.

7. A communication apparatus for receiving data from another communication apparatus, comprising:
a receiving unit that receives, from an information processing apparatus, an import request which requests the communication apparatus to import export data generated by the another communication apparatus, wherein the export data includes an address book which contains a transmission address which is expressed by a Fully Qualified Domain Name (FQDN), and an address of a Domain Name System (DNS) server which performs name resolution of the transmission address which is expressed by the FQDN; and
a setting unit that sets the address book and the address of the DNS server in the communication apparatus based on the export data which is imported to the communication apparatus in accordance with the import request that has been received by the receiving unit.

8. A method of controlling a communication system having a first communication apparatus comprising a storage unit that stores an address book containing transmission addresses, a second communication apparatus, and a Domain Name System (DNS) server, the method comprising:
in the first communication apparatus:
accepting an export request from an information processing apparatus;
determining whether the address book to be exported contains a transmission address which is expressed by a Fully Qualified Domain Name (FQDN);
generating export data which includes the address book in accordance with the acceptance of the export request, wherein the generated export data includes an address of the DNS server in a case where it is determined that the address book to be exported contains a transmission address which is expressed by the FQDN, wherein the DNS server performs name resolution of the transmission address which is expressed by the FQDN; and
transmitting the generated export data to the information processing apparatus; and
in the second communication apparatus:
receiving an import request which requests the second communication apparatus to import the export data generated by the first communication apparatus from the information processing apparatus; and
setting the address book and the address of the DNS server in the second communication apparatus based on the export data which is imported to the second communication apparatus in accordance with the received import request.

9. A method of controlling a communication apparatus, for transmitting data to another communication apparatus, comprising a storage unit that stores an address book containing transmission addresses, the method comprising:
accepting an export request from an information processing apparatus;

determining whether the address book to be exported contains a transmission address which is expressed by a Fully Qualified Domain Name (FQDN);

generating export data which includes the address book in accordance with an acceptance of the export request, wherein the generated export data includes an address of a DNS server in a case where it is determined that the address book to be exported contains a transmission address which is expressed by the FQDN, wherein the DNS server performs name resolution of the transmission address which is expressed by the FQDN; and transmitting the generated export data to the another information processing apparatus.

10. A method of controlling a communication apparatus for receiving data from another communication apparatus, the method comprising:

receiving, from an information processing apparatus, an import request which requests the communication apparatus to import export data generated by the another communication apparatus, wherein the export data includes an address book containing a transmission address, which is expressed by a Fully Qualified Domain Name and an address of a Domain Name System (DNS) server; and setting the address book and the address of the DNS server in the communication apparatus based on the export data which is imported to the communication apparatus in accordance with the received import request.

11. A non-transitory computer-readable storage medium storing a program for executing on a computer a control method of controlling a communication system having a first communication apparatus comprising a storage unit that stores an address book containing transmission addresses, a second communication apparatus, and a Domain Name System (DNS) server, the method comprising:

in the first communication apparatus:
accepting an export request from an information processing apparatus;
determining whether the address book to be exported contains a transmission address, which is expressed by a Fully Qualified Domain Name (FQDN);
generating export data which includes the address book in accordance with the acceptance of the export request, wherein the generated export data includes an address of the DNS server in a case where it is determined that the address book to be exported contains a transmission address which is expressed by the FQDN, wherein the DNS server performs name resolution of the transmission address which is expressed by the FQDN; and
transmitting the generated export data to the information processing apparatus; and in the second communication apparatus:
receiving an import request which requests the second communication apparatus to import the export data generated by the first communication apparatus from the information processing apparatus; and
setting the address book and the address of the DNS server in the second communication apparatus based on the export data which is imported to the second communication apparatus in accordance with the received import request.

12. A non-transitory computer-readable storage medium storing a program for executing on a computer a control method of controlling a communication apparatus, for transmitting data to another communication apparatus, comprising a storage unit that stores an address book containing transmission addresses, the method comprising:

accepting an export request from an information processing apparatus;
determining whether the address book to be exported contains a transmission address which is expressed by a Fully Qualified Domain Name (FQDN);
generating export data which includes the address book in accordance with the acceptance of the export request, wherein the generated export data including an address of a DNS server in a case where it is determined that the address book to be exported contains a transmission address which is expressed by the FQDN, wherein the DNS server performs name resolution of the transmission address which is expressed by the FQDN; and
transmitting the generated export data to the another information processing apparatus.

13. A non-transitory computer-readable storage medium storing a program for executing on a computer a control method of controlling a communication apparatus for receiving data from another communication apparatus, the method comprising:

receiving, from an information processing apparatus, an import request which requests the communication apparatus to import export data generated by the another communication apparatus, wherein the export data includes an address book which contains a transmission address, which is expressed by a Fully Qualified Domain Name (FQDN) and an address of a Domain Name System (DNS) server; and setting the address book and the address of the DNS server in the communication apparatus based on the export data which is imported to the communication apparatus in accordance with the received import request.

* * * * *